US008435623B2

(12) United States Patent
Jundt et al.

(10) Patent No.: US 8,435,623 B2
(45) Date of Patent: May 7, 2013

(54) APPARATUS FOR INSULATING EXPOSED FASTENERS

(75) Inventors: Darrell Clyde Jundt, Derby, KS (US); Chris Ronald Gernaat, Tullahoma, TN (US); Jay F. Shore, Wichita, KS (US); Rory Lee Deichert, Mulvane, KS (US); Sean Christopher Underwood, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 536 days.

(21) Appl. No.: 12/644,867

(22) Filed: Dec. 22, 2009

(65) Prior Publication Data
US 2011/0151184 A1    Jun. 23, 2011

(51) Int. Cl.
*B32B 3/24* (2006.01)
*F16B 37/14* (2006.01)

(52) U.S. Cl.
USPC .................. 428/131; 428/138; 411/372.6

(58) Field of Classification Search .................. 428/131, 428/138; 411/372.6
See application file for complete search history.

(56) References Cited

U.S. PATENT DOCUMENTS

| 6,012,889 A * | 1/2000 | Robbins et al. ............ 411/372.6 |
| 7,584,582 B1 * | 9/2009 | Hutter, III .................. 52/506.02 |
| 7,931,430 B2 * | 4/2011 | Thrift ............................ 411/121 |
| 2010/0034614 A1 * | 2/2010 | Dean et al. ................. 411/372.6 |

* cited by examiner

*Primary Examiner* — William P Watkins, III
(74) *Attorney, Agent, or Firm* — Hovey Williams LLP

(57) ABSTRACT

A removable fastener insulating device comprising a heat resistant cover configured for insulating a fastener. The heat resistant cover may comprise a first portion with a hole formed therein for the fastener to be inserted through and a second portion with a cavity formed therein. The cavity may be lined with an insulating portion made of material resistant to heat transfer. In use, a portion of the fastener may be inserted into the hole of the heat resistant cover and the second portion may be actuated into the closed position. In the closed position, an end portion of the fastener may reside within the cavity between the first portion and the second portion. The heat resistant cover may also comprise attachment elements for holding the second portion in the closed position against the first portion.

11 Claims, 5 Drawing Sheets

APPARATUS FOR INSULATING EXPOSED FASTENERS

BACKGROUND

1. Field

The present invention relates to a removable apparatus for shielding exposed fasteners from heat.

2. Related Art

Aircraft components are often exposed to great amounts of heat from aircraft engines. Insulation blankets are often attached to critical aircraft components to protect them from such heat. However, fasteners used to attach the insulation blankets are often comprised of conductive material such as metal and thus transfer heat to the underlying aircraft component.

To prevent heat from passing through fasteners to underlying aircraft components, heat-resistant attachments for shielding the fasteners are sometimes welded to the insulation blanket. This method requires that metallic face sheets be used on the insulation blanket to allow for welding. Furthermore, if the heat-resistant attachment is damaged and/or an attachment point between the heat-resistant attachment and the insulation blanket is damaged, repair of both the heat-resistant attachment and the insulation blanket is required.

Accordingly, there is a need for an improved way to shield exposed fasteners from heat.

SUMMARY

Embodiments of the present invention provide a removable fastener insulating device for insulating a fastener from excessive heat. The removable fastener insulating device may be a heat resistant cover which may comprise a first portion having a hole formed therethrough, a second portion having a cavity formed therein, and a hinge portion joining the first portion and the second portion. The fastener to be shielded by the heat resistant cover may have an elongated attachment portion and a relatively enlarged head portion attached near one end of the elongated attachment portion. The head portion may be bonded to an aircraft component while the elongated attachment portion may be attached to another component such as an insulation blanket. The elongated attachment portion may extend through the heat insulation blanket and then through the hole of the first portion of the heat resistant cover.

At least part of the elongated attachment portion may extend into the cavity of the second portion between the first portion and the second portion when heat resistant cover is in a closed position, while the head portion may be positioned outward of the heat resistant cover. The second portion of the heat resistant cover may comprise a flange portion and a depressed portion forming the cavity. In some embodiments of the invention, the cavity may be shaped like a hollow frustum of a right circular cone. An insulating material may be placed onto the second portion of the heat resistant cover within the cavity to shield the elongated attachment portion of the fastener from heat.

The hinge portion may be a line of weakness formed between the first and second positions or any other type of hinge mechanism. Attachment elements, such as bendable tabs, may be formed on the first portion and/or the second portion to hold the second portion closed against the first portion. In operation, the heat resistant cover may be placed in an open position with the first and second portions positioned next to each other or in the closed position in which the first and second portions mate with each other such that the cavity and the hole area are substantially vertically aligned.

A method of the present invention may comprise inserting a fastener into a hole of a first portion of a heat resistant cover then pivoting a second portion of the heat resistant cover toward the first portion of the heat resistant cover into a closed position. In the closed position, a portion of the fastener may be positioned within a cavity of the second portion, between the first and second portions. The method may further comprise engaging attachment elements of the heat resistant cover to retain the second portion of the heat resistant cover in the closed position. For example, the attachment elements may be bendable tabs of the first portion which may fold over and onto at least part of the second portion to hold it against the first portion.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

Figure 1:
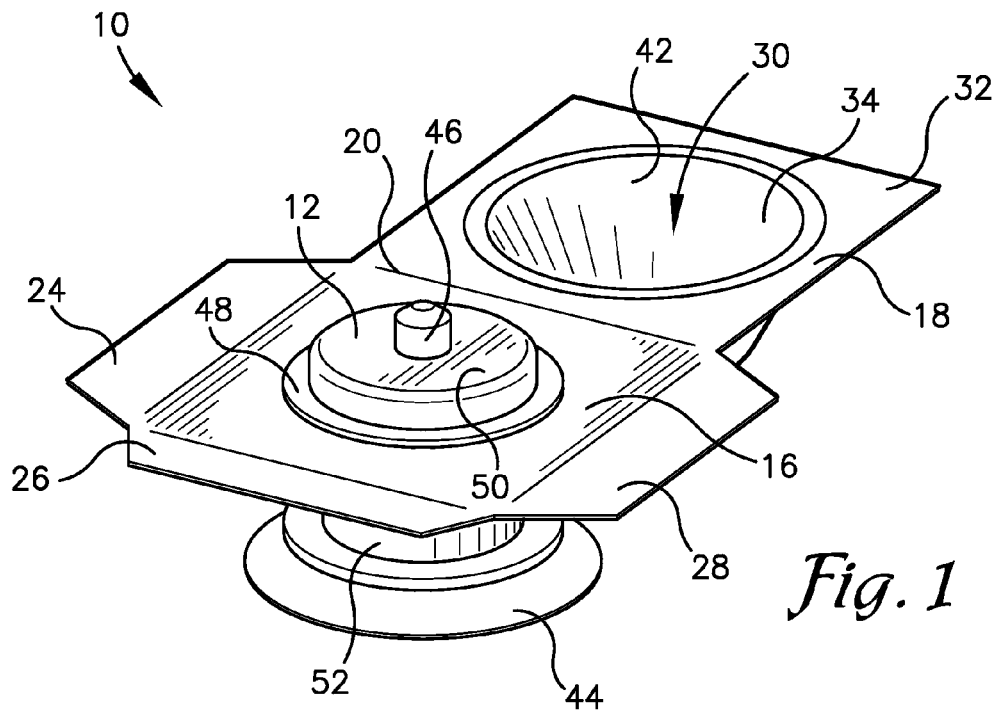
FIG. 1 is a perspective view of a fastener inserted through a heat resistant cover constructed according to an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 6:
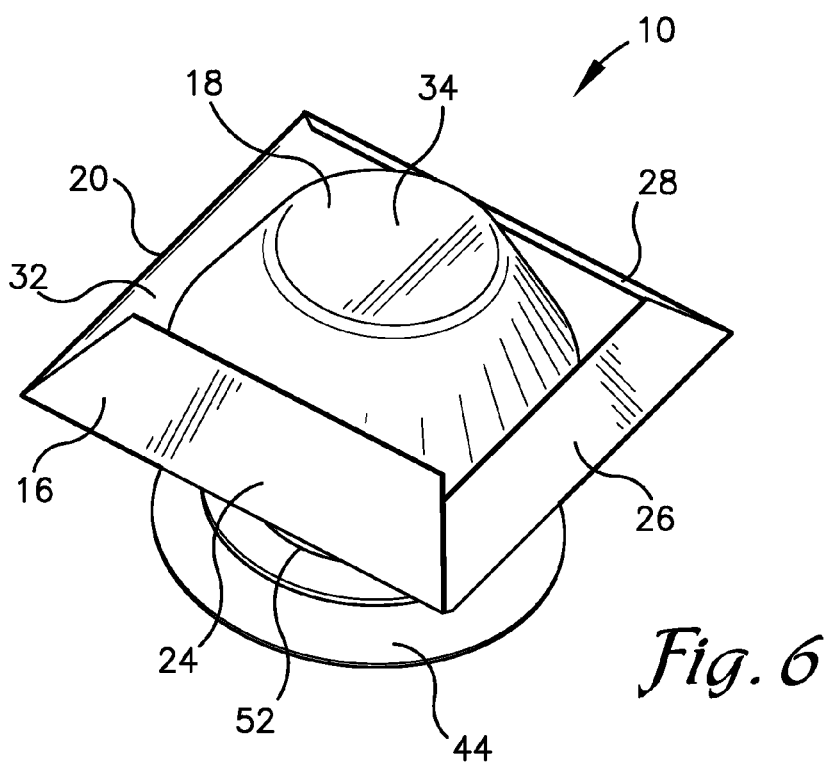
FIG. 6 is a perspective view of the heat resistant cover of FIG. 1 with attachment elements positioned to retain the heat resistant cover in the closed position.
Figure 7:
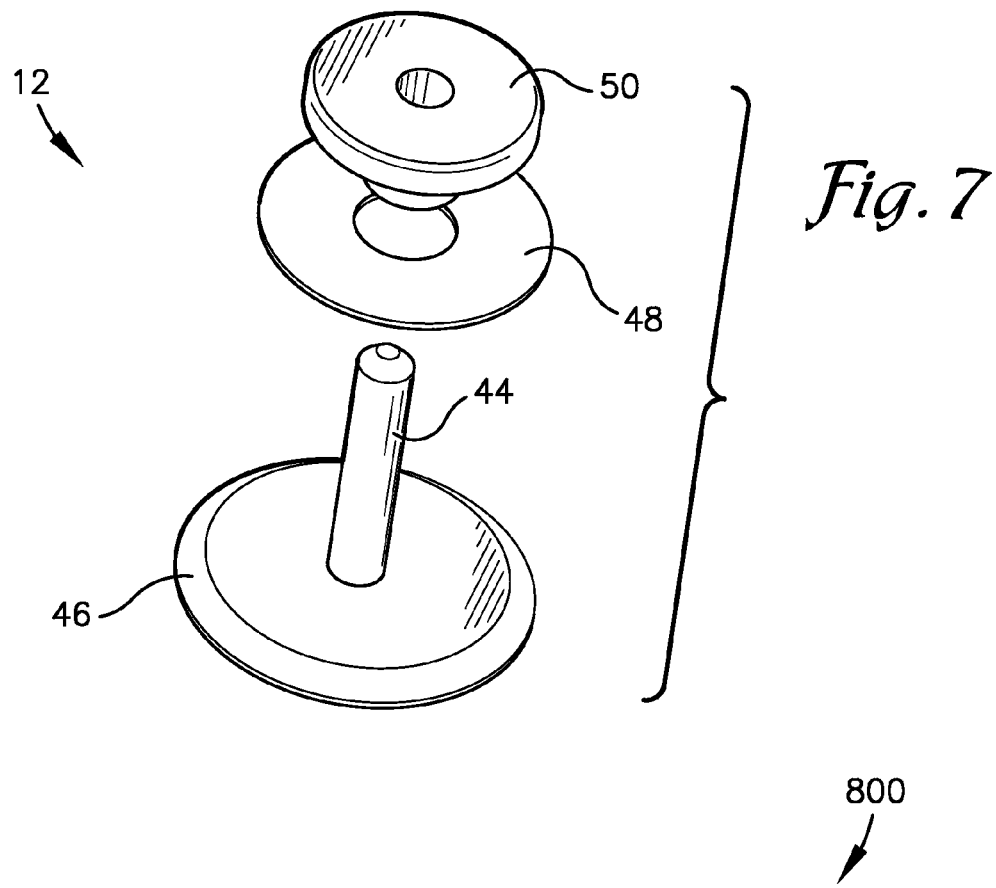
FIG. 7 is a perspective view of the fastener of FIG. 1.
Figure 9:
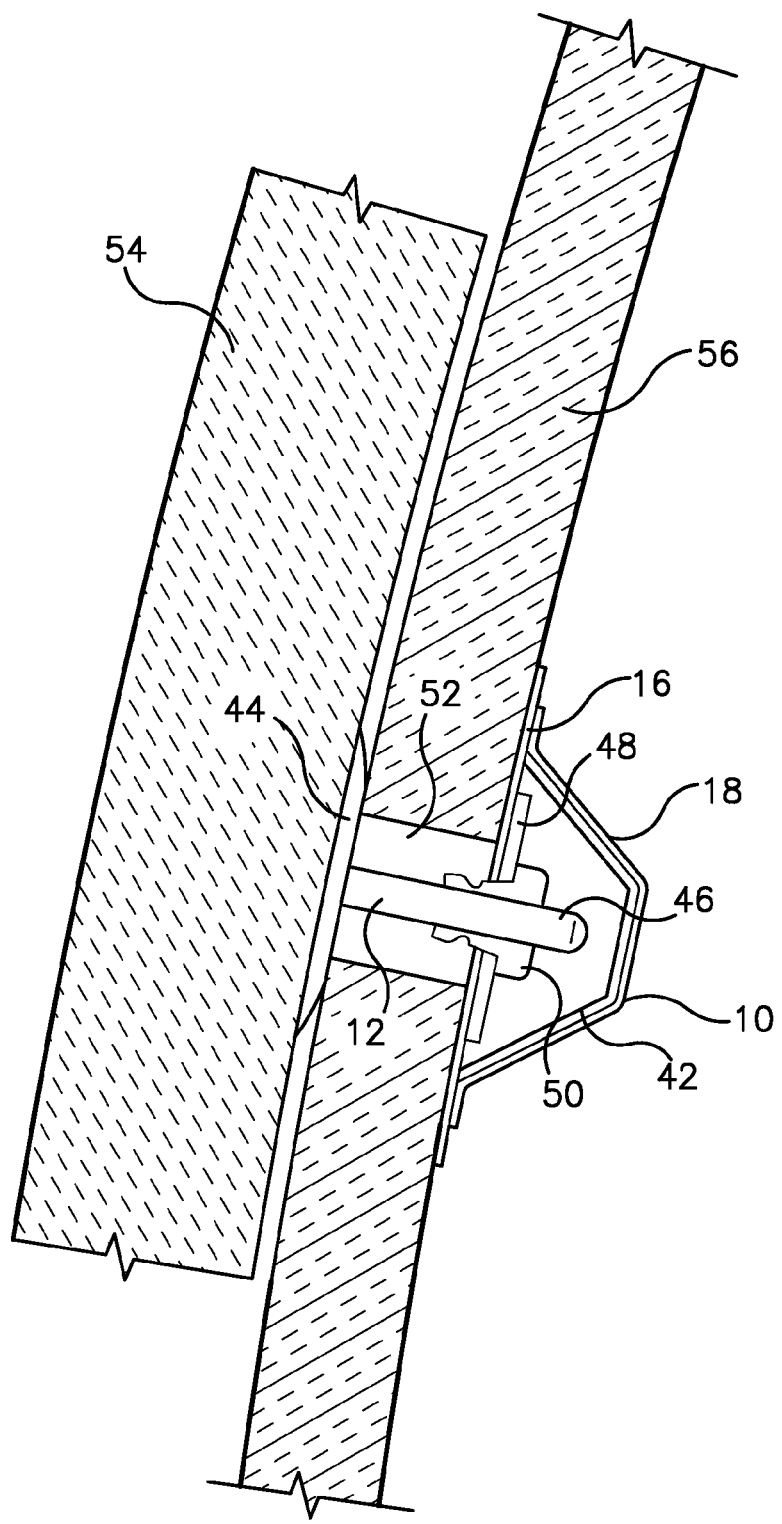
FIG. 9 is a schematic cross-sectional view of the heat resistant cover and the fastener of FIG. 1 attaching two components to each other.

The present invention is a removable fastener insulating device. In one embodiment of the invention illustrated in FIGS. 1-6, the removable fastener insulating device may comprise a heat resistant cover 10 for insulating a fastener 12. The fastener 12, as illustrated in FIGS. 7 and 9, may be formed of metal or other sufficiently strong, generally conductive materials and may comprise an elongated attachment portion 46 and a relatively enlarged head portion 44 attached near one end of the elongated attachment portion 46. For example, the fastener 12 may be a mechanical fastener configured similar to a bolt or a screw. In some embodiments of the invention, the fastener 12 may further comprise a washer 48 and/or a nut 50 for attachment on the elongated attachment portion 46.

As illustrated in FIG. 9, the heat resistant cover 10 is configured to shield an end of the elongated attachment portion 46 of the fastener 12 from heat, such as engine heat. Furthermore, the washer 48 and/or nut 50 may also be shielded from engine heat by the heat resistant cover 10, as later described herein. FIG. 9 illustrates the fastener 12 joining two parts 54,56 together with the elongated attachment portion 46 extending into or through at least one of the parts 54,56 to be attached. The head portion 44 may be attached or bonded to a surface of one of the parts 54,56. For example, the head portion 44 may be bonded or otherwise attached to a panel 54 of an aircraft and an insulation blanket 56 may be attached to the panel 54 using the fastener 12. The insulation blanket 56 may be configured to shield the panel 54 from engine heat. As illustrated in FIG. 9, the insulation blanket 56 may comprise a bushing or spacer 52 through which the elongated attachment portion 46 may be inserted. The elongated attachment portion 46 may also extend through a hole 22 of the heat resistant cover 10, as later described herein.

Figure 3:
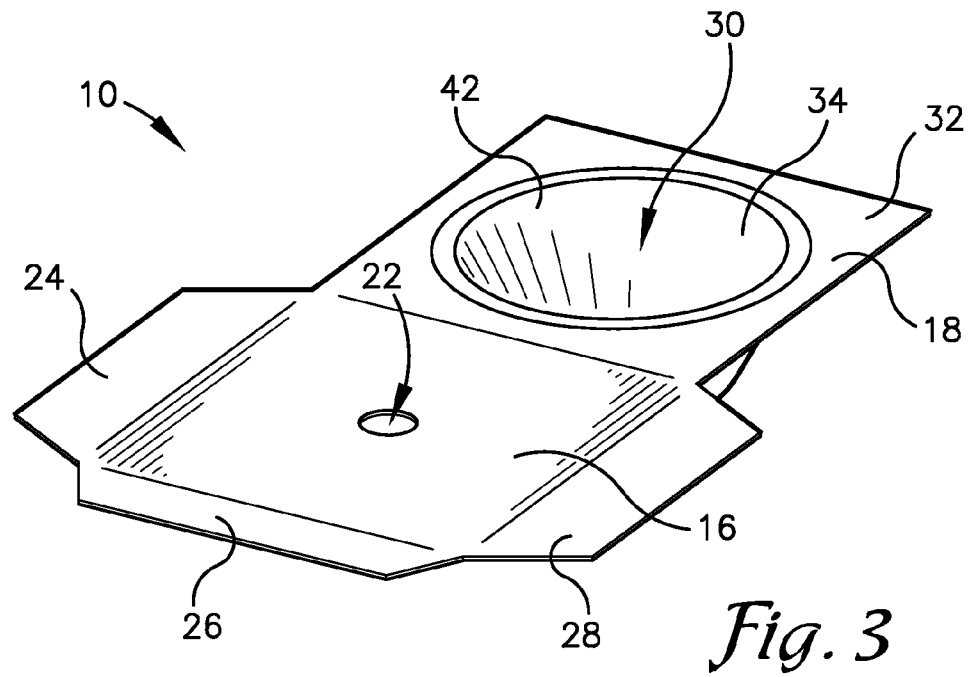
FIG. 3 is a perspective view of the heat resistant cover of FIG. 1 without the fastener inserted therethrough.

The heat resistant cover 10 may be made of any heat resistant material such as corrosion-resistant steel (CRES), stainless steel, and any other sufficiently durable material. The heat resistant materials may conduct heat but generally have high melting points. The heat resistant cover 10 may comprise a first portion 16, a second portion 18, and a hinge portion 20 connecting the first portion 16 with the second portion 18. The first portion 16 may be of any shape and has a hole 22 formed therein, as illustrated in FIG. 3, for permitting passage of the fastener 12. For example, the first portion 16 may be a substantially thin, rectangular sheet of the heat resistant material with the hole 22 substantially centrally located therethrough. In some embodiments of the invention, a plurality of holes (not shown) may be formed through the first portion 16. In various embodiments of the invention, the hole may have a diameter slightly larger or equal to a diameter of the elongated attachment portion 46, but smaller than a diameter of the head portion 48, such that the head portion 48 resides outward of the heat resistant cover 10 and at least part of the elongated attachment portion 46 rests inward of the heat resistant cover 10 when it is in a closed position.

Additionally, the first portion 16 may also comprise one or more attachment elements 24,26,28, such as one or more tabs integral with the first portion 16 and operable to fold inward toward the hole 22 or holes and hold the second portion 18 against the first portion 16, as later described herein. The attachment elements 24-28 or tabs may be located at peripheral edges of the first portion 16 and formed of the same material as the heat resistant cover 10. Furthermore, the attachment elements 24-28 or tabs may have lines of weakness stamped or creased therein for ease of bending the tabs. In some embodiments of the invention, the attachment elements 24-28 may additionally or alternatively comprise heat resistant hooks, loops, and/or metal tabs for attachment to the second portion 18 of the heat resistant cover 10.

Figure 2:
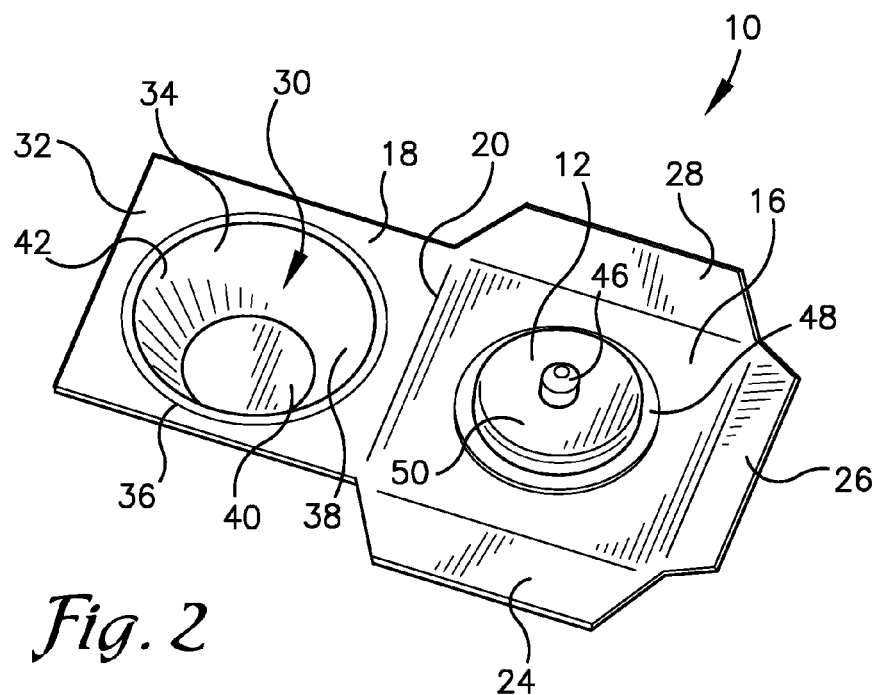
FIG. 2 is another perspective view of the fastener and heat resistant cover placed in the open position.

The second portion 18 of the heat resistant cover 10 may be hingedly connected to the first portion 16 and shaped or molded to form a cavity 30 therein of any hollow shape for covering an end of the fastener 12. Specifically, the second portion 18 may comprise a flange portion 32 configured for contacting and/or attaching to the first portion 16 of the heat resistant cover 10 and a depressed portion 34 forming walls or boundaries of the cavity 30. The cavity 30 and/or the depressed portion 34 may be of any hollow, three-dimensional shape, such as square, rectangular, cylindrical, cone-like, hemispherical, etc. In one embodiment of the invention, the cavity 30 and the depressed portion 34 may be shaped like a hollow frustum of a right circular cone, with a circular boundary 36 meeting the flange portion 32 of the second portion 18, one or more side walls 38 extending from the circular boundary 36 and angled toward a center axis (not shown) of the circular boundary 36 in a substantially conical manner, and a circular base wall 40 meeting at edges of the side walls 38 opposite the circular boundary 36, as illustrated in FIG. 2. The diameter of the circular base wall 40 may be substantially smaller than the diameter of the circular boundary 36 and a center axis of the circular boundary 36 may also be the center axis of the circular base wall 40. In embodiments where the first portion 16 comprises a plurality of holes, the second portion 18 may also comprise a plurality of depressed portions (not shown), thereby providing insulating cavities for insulating a plurality of fasteners (not shown).

As illustrated in FIGS. 1-3, the insulating portion 42 comprised of insulating material may be applied to inner walls of the depressed portion of the heat resistant cover 10. For example, the side walls 38 and circular base wall 40 may be coated in an insulating material to form the insulating portion. Alternatively, the insulating portion 42 may be pre-formed and shaped to match the shape of the depressed portion 34, then bonded thereto. The insulating portion 42 may comprise any thermal insulating, non-conductive material such as MIN-K or any other known material which is resistant to heat transfer.

The flange portion 32 of the second portion 18 of the heat resistant cover 10 may be a substantially thin, rectangular sheet of the heat resistant material with the depressed portion 34 substantially centered relative thereto. However, the flange portion 32 may have any shape and configuration without departing from the scope of the invention. In embodiments of the invention in which a plurality of holes and depressed portions are present, the flange portion 32 may extend around and in between each of the depressed portions 34.

In some embodiments of the invention, the second portion may be shiftable between an open position and the closed position, as later described herein. Furthermore, the second portion may additionally or alternatively comprise one or more of the attachment elements 24-28, such as the one or more integral and/or metal tabs, heat resistant hooks, and/or loops for attachment to the first portion 16 of the heat resistant cover 10. For example, the first portion 16 may comprise a loop while the second portion 18 may comprise a corresponding hook to be inserted through the loop, thereby restraining the heat resistant cover 10 in the closed position.

Figure 4:
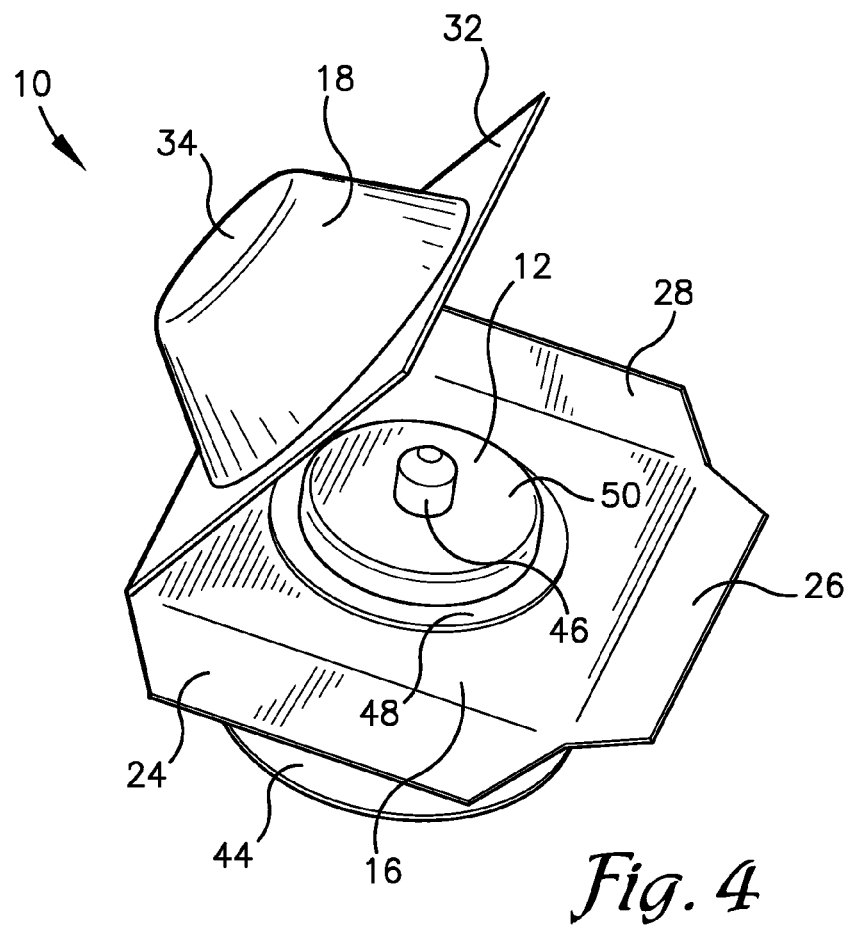
FIG. 4 is a perspective view of the fastener and the heat resistant cover shown partially between its open position and closed position.
Figure 5:
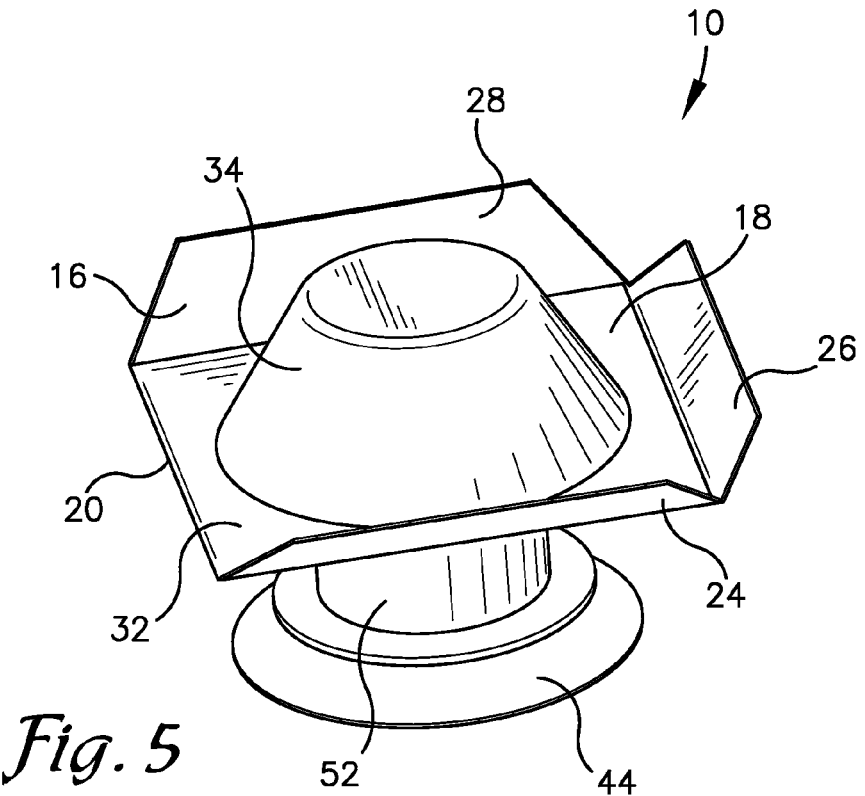
FIG. 5 is a perspective view of the heat resistant cover shown in its closed position.

The hinge portion 20 of the heat resistant cover 10 may be a line of weakness such as a crease, a mechanical hinging device, or any sort of attachment between the first and second portions 16,18 that allow the second portion 18 to rotate from an open position away from the first portion 16 to the closed position flush against the first portion 16. The hinge portion 20 may be any bendable portion joining the first and second portions 16,18 and may be integral with the first and/or second portions 16,18. The hinge portion may actuate the second portion 18 to rotate or pivot toward and rest against the first portion 16 as well as rotate or pivot open away from the first portion 16. Likewise, the first and second portions 16,18 may be two separate parts joined by a mechanical hinging or bending apparatus to allow the second portion 18 to pivot or rotate to cover and rest on the first portion 16. Specifically, in some embodiments of the invention, a surface of the flange portion 32 and a surface of the first portion 16 may rest flush against each other when the heat resistant cover 10 is in the closed position, as illustrated in FIGS. 5-6, and may rest side-by-side or apart from each other when the heat resistant cover 10 is in the open position, as illustrated in FIGS. 1-3. FIG. 4 illustrates the second portion 18 positioned part-way between the open and closed positions.

In use, the heat resistant cover 10 may have the elongated attachment portion 46 of the fastener 12 inserted into the hole 22 of the first portion 16 of the heat resistant cover 10 and then the second portion 18 may be actuated into the closed position. In the closed position, at least a portion of the elongated attachment portion 46 may rest within the cavity 30 between the first portion 16 and the second portion 18 of the heat resistant cover 10. The attachment elements 24-28 may hold the second portion 16 in the closed position against the first portion 18.

Figure 8:
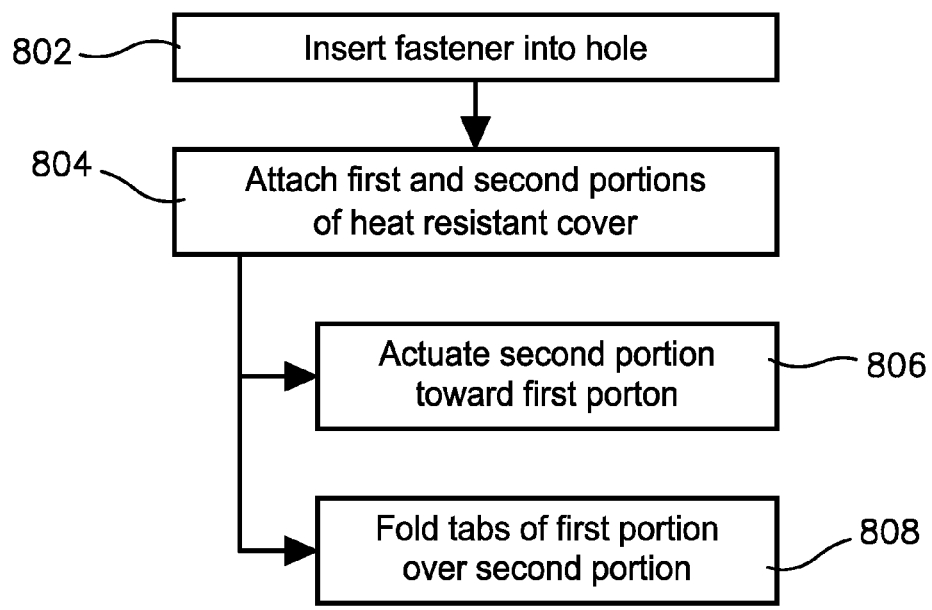
FIG. 8 is a flow chart of a method of shielding a fastener from heat using a heat resistant cover according to an embodiment of the present invention.

The flow chart of FIG. 8 depicts the steps of exemplary methods of the invention in more detail. In some alternative implementations, the functions noted in the various blocks may occur out of the order depicted in FIG. 8. For example, two blocks shown in succession in FIG. 8 may in fact be executed substantially concurrently, or the blocks may sometimes be executed in the reverse order depending upon the functionality involved.

As illustrated in FIG. 8, a method 800 of shielding the fastener 12 may comprise inserting the elongated attachment portion 46 of the fastener 12 through the hole 22 formed in the first portion 16 of the heat resistant cover 10, as depicted in step 802, and attaching the second portion 18 of the heat resistant cover 10 to the first portion 16 of the heat resistant cover 10, as depicted in step 804, such that at least part of the elongated attachment portion 46 of the fastener 12 is positioned between the first portion 16 and the second portion 18. For example, a tip or end portion of the elongated attachment portion 46 may rest within the cavity 30 when the heat resistant cover 10 is in the closed position. Furthermore, when the heat resistant cover 10 is in the closed position, the cavity 30 and the hole 22 may be substantially aligned with each other. For example, the depressed portion 34 may be centered along a shared vertical axis with the hole 22 in the closed position.

The attaching step 804 may further comprise actuating the second portion 18 toward the first portion 16 via the hinge portion 20, as depicted in step 806. As described above, the hinge portion 20 may pivotally connect the first portion 16 with the second portion 18 of the heat resistant cover 10. The attaching step 804 may also comprise folding the attachment elements 24-28, such as tabs, of the first portion 16 over at least part of the second portion 18 to retain the second portion 18 against the first portion 16, as depicted in step 808.

In the example embodiment of the invention illustrated in FIG. 9, the head portion 44 of the fastener 12 may be click bonded or otherwise attached to the panel 54. Furthermore, the spacer 52 of the insulation blanket 56 may be placed over the fastener 12 such that the elongated attachment portion 46 slides through the spacer 52. Then the heat resistant cover 10 may be slid onto the elongated attachment portion 46, with the elongated attachment portion 46 extending through the hole 22. Then the second portion 18 of the heat resistant cover 10 may be actuated into the closed position, as illustrated in FIG. 5, and held in the closed position by the attachment element(s) 24-28 described above. For example, the attachment elements 24-28 may be tabs of the first portion 16 which may be folded over at least part of the second portion 18, as illustrated in FIG. 6. In the closed position, an end of the elongated attachment portion 46, the washer 48, and/or the nut 50 may reside within the cavity 30, located between the first portion 16 and the depressed portion 34 of the second portion 18.

The heat resistant cover 10 provides insulation to the fastener 12. In prior art methods, insulators for fasteners were welded to the insulation blanket. However, the heat resistant cover 10 of the present invention provides a self contained apparatus which does not require direct attachment to the items being attached by the fastener 12. Instead, the fastener 12 of the present invention may attach both the heat resistant cover 10 and the insulation blanket to the aircraft panel, such that if the heat resistant cover 10 is damaged, it can be replaced without impacting the insulation blanket 56. The prior art methods, if the insulator for the fastener was damaged, repair of both the insulator for the fastener and the insulation blanket was required. By using the heat resistant cover 10 of the present invention, insulation blankets with non-metallic face sheets may also be used, since there is no need to weld an insulator for the fastener to the insulation blanket.

Although the invention has been described with reference to the embodiments illustrated in the attached drawing figures, it is noted that equivalents may be employed and substitutions made herein without departing from the scope of the invention as recited in the claims. For example, some embodiments of the invention may include both the heat resistant cover 10 and the fastener 12 sized and configured to be removably attachable with each other.

Having thus described various embodiments of the invention, what is claimed as new and desired to be protected by Letters Patent includes the following:

The invention claimed is:
1. A fastener insulating device comprising:
a first portion having a hole formed therethrough for permitting passage of the fastener;
a second portion hingedly connected to the first portion and having a cavity formed therein for covering an end of the fastener, wherein the second portion mates with the first portion such that the cavity and the hole are substantially aligned;
an insulating portion comprised of insulating material attached within the cavity of the second portion; and
bendable tabs located at one or more peripheral edges of the first portion and configured to bend onto at least part of the second portion.

2. The fastener insulating device of claim 1, wherein the second portion is shiftable between an open position such that the second portion does not contact the first portion and a closed position in which the second portion contacts and substantially overlies the first portion.

3. The fastener insulating device of claim 1, wherein the first portion is hingedly connected to the second portion by a line of weakness formed between the first and second portions.

4. The fastener insulating device of claim 1, wherein the second portion comprises a flange portion and a depressed portion forming the cavity, wherein the cavity is shaped like a hollow frustum of a right circular cone.

5. A fastener insulating device comprising:
  a first portion having a hole formed therethrough,
  a second portion having a cavity formed therein,
  an insulating portion comprised of insulating material attached within the cavity of the second portion;
  a hinge portion joining the first portion and the second portion;
  a heat resistant hook or tab attached to one of the first and second portions; and
  a heat resistant loop attached to another one of the first and second portions,
  wherein the second portion is shiftable between an open position and a closed position wherein the cavity and the hole are substantially aligned and at least part of the second portion rests flush against at least part of the first portion,
  wherein the heat resistant loop and the heat resistant hook or tab are configured to restrain the first portion and the second portion in the closed position.

6. The fastener insulating device of claim 5, wherein the first and second portions and the hinge portion are integrally formed as a single part and the hinge portion is a line of weakness formed between the first and second portions and configured to actuate the second portion toward the first portion.

7. The fastener insulating device of claim 5, wherein the second portion comprises a flange portion and a depressed portion forming the cavity, wherein the cavity is shaped like a hollow frustum of a right circular cone.

8. A fastener insulating device comprising:
  a heat-conducting fastener with a head portion and an elongated attachment portion extending from the head portion; and
  a heat resistant cover for shielding the heat-conducting fastener, the heat resistant cover comprising:
    a first portion having a hole formed therethrough,
    a second portion having an inner surface and an outer surface and having a cavity formed therein,
    an insulating portion comprised of insulating material attached within the cavity of the second portion,
    a hinge portion joining the first portion and the second portion, and
    bendable tabs located at one or more peripheral edges of the first portion and configured to bend over and onto the outer surface of the second portion;
  wherein the second portion is shiftable between an open position and a closed position,
  wherein the elongated attachment portion is configured to extend through the hole of the first portion of the heat resistant cover, with at least a portion of the elongated attachment portion located between the first portion and the second portion when the second portion is in the closed position,
  wherein the heat-conducting fastener is spaced apart from the insulating portion.

9. The fastener insulating device of claim 8, wherein the fastener is at least one of a metal bolt and a metal screw.

10. A method of shielding a fastener having an elongated attachment portion and a head portion from heat via a heat resistant cover having a first portion with a hole formed therein and a second portion with a cavity formed therein, the method comprising:
  inserting the elongated attachment portion of the fastener through the hole formed in the first portion of the heat resistant cover; and
  attaching the second portion of the heat resistant cover to the first portion of the heat resistant cover such that at least a portion of the conductive fastener is positioned between the first portion and the second portion within the cavity of the second portion; and
  folding tabs of the first portion onto an outer surface of the second portion to retain the second portion against the first portion.

11. The method of claim 10, wherein the attaching step further comprises:
  actuating the second portion toward the first portion via a hinge portion pivotally connecting the first portion with the second portion of the heat resistant cover.

* * * * *